United States Patent
Lopes

(10) Patent No.: US 8,081,985 B2
(45) Date of Patent: Dec. 20, 2011

(54) LOAD MANAGEMENT FOR A MOBILITY MANAGEMENT ENTITY OF A CELLULAR COMMUNICATION SYSTEM

(75) Inventor: Luis Lopes, Swindon (GB)

(73) Assignee: Motorola Mobility, Inc., Libertyville, IL (US)

( * ) Notice: Subject to any disclaimer, the term of this patent is extended or adjusted under 35 U.S.C. 154(b) by 406 days.

(21) Appl. No.: 12/469,759

(22) Filed: May 21, 2009

(65) Prior Publication Data

US 2009/0318161 A1    Dec. 24, 2009

(30) Foreign Application Priority Data

Jun. 18, 2008    (GB) .................................. 0811179.1

(51) Int. Cl.
*H04W 72/00*    (2009.01)
(52) U.S. Cl. ..................... 455/453; 455/432.1; 455/436; 455/439; 455/440; 455/445; 370/229; 370/233; 370/234; 370/331; 370/332
(58) Field of Classification Search .......... 455/428–453, 455/456.1–456.3; 370/331–334
See application file for complete search history.

(56) References Cited

U.S. PATENT DOCUMENTS

| 2009/0069007 | A1* | 3/2009 | Xiao .............................. 455/424 |
| 2009/0233600 | A1* | 9/2009 | Johansson et al. .......... 455/435.2 |
| 2011/0065436 | A1* | 3/2011 | Svedevall et al. ............. 455/436 |
| 2011/0149782 | A1* | 6/2011 | Townley et al. .............. 370/252 |

FOREIGN PATENT DOCUMENTS

| CN | 101114927 A | 1/2008 |
| EP | 1282321 B1 | 2/2005 |
| WO | 2006114628 A2 | 11/2006 |

* cited by examiner

*Primary Examiner* — Dai A Phuong

(57) ABSTRACT

A cellular communication system comprises a Mobile Management Entity, MME, 117 and a load characteristic processor 203 that determines an MME load characteristic for base stations 101-107 in response to a measured operating characteristic thereof. A selection processor 207 selects a subset of base stations in response to the MME load characteristics, and a load monitor 205 determines an MME load level measure. A transmit controller 209 transmits a load reduction indication for the MME to the subset of base stations in response to the MME load level measure meeting a criterion. The base stations receiving the load reduction indication bias their operation towards a reduced load level of the MME.

18 Claims, 3 Drawing Sheets

LOAD MANAGEMENT FOR A MOBILITY MANAGEMENT ENTITY OF A CELLULAR COMMUNICATION SYSTEM

FIELD OF THE INVENTION

The invention relates to load management for a mobility management entity of a cellular communication system and in particular, but not exclusively, for a mobility management entity of a Long Term Evolution (LTE) cellular communication system

BACKGROUND OF THE INVENTION

Cellular communication systems supporting mobile communications have become ubiquitous and in particular second generation cellular communication systems such as the Global System for Mobile Communication (GSM) and third Generation cellular communication systems such as the Universal Mobile Telecommunication System (UMTS) have become widespread.

In order to provide improved communication services and increased efficiency, cellular communication systems are continuously developed and enhanced. For example, currently, the 3rd Generation Partnership Project (3GPP) standards body is in the process of standardising improvements to GSM and UMTS known as Long Term Evolution (LTE).

In comparison to systems such as GSM and UMTS, LTE employs an architecture wherein the base stations (also referred to as evolved Node Bs (eNBs)) comprise more functionality. For example, the eNBs tend to be responsible for many functions associated with the air interface resource control and management including for example admission control, handover management etc. For example, the eNBs of LTE are responsible for many of the functions that are performed by a Base Station Controller (BSC) of a GSM system or a Radio Network Controller (RNC) of a UMTS system.

In LTE, a simpler network architecture tends to be used wherein the eNBs are directly coupled to core network elements. Furthermore, for LTE, the user plane (user data traffic) and control plane (for control data signaling) are treated separately. Specifically, the eNBs are coupled to Serving Gateways of the Core Network for supporting the user plane and to a Mobile Management Entity (MME) for supporting the control plane.

The MME provides functionality for managing the mobility of the user equipments including for example keeping track of the location of the user equipment, changing Serving Gateways, MME handovers, paging etc.

However, a problem in many LTE systems and scenarios is that MMEs may be overloaded. For example, the signaling required to support the user equipments registered with an MME may exceed the bandwidth of the MME's interfaces or the processing required may exceed the available computational or memory resource.

In order to address MME overloading, different solutions have been proposed. However, these tend to be suboptimal and have associated disadvantages.

Specifically, it has been proposed that static capacity information for the available MMEs may be stored in the eNBs and used by the eNB when selecting MMEs. However, although this may improve the load distribution, it tends to be inflexible and is incapable of dynamically adjusting the load distribution to the specific conditions experienced. Thus, whereas it may allow statistical averaging, it does not avoid or react to overload conditions.

It has also been proposed to broadcast overload conditions to all eNBs when an MME is overloaded. However, this tends to be suboptimal as eNBs typically cannot take significant short term remedial action that can resolve the overload situation quickly. This is due to the fact that MME (re)selection is only possible at specific events such as on attachment or for some MME handovers. Thus, the approach tends to be inflexible and provide insufficient load correction. Furthermore, it may further increase the loading of the MME at a time when this is already overloaded as it needs to communicate the overloading to the eNBs.

It has also been proposed that the MMEs broadcast continuous load indicators to the eNBs. However, whereas this may dynamically adapt and improve the load distribution between MMEs, it also increases the loading of the MMEs as frequent load indications need to be transmitted. It furthermore uses significant bandwidth and complicates processing at the MME and eNBs.

Hence, an improved system would be advantageous and in particular a system allowing increased flexibility, improved MME load distribution, facilitated operation, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a cellular communication system comprising: a first Mobile Management Entity, MME; a plurality of base stations coupled to the first MME and arranged to support user equipments over an air interface; load means for determining an MME load characteristic for the first MME for each base station of the plurality of base stations in response to a measured operating characteristic of each base station; selection means for selecting a subset of base stations from the plurality of base stations in response to the MME load characteristics; load level means for determining a load level measure for the first MME; and transmitting means for transmitting a load reduction indication for the first MME to the subset of base stations in response to the load level measure for the first MME meeting a first criterion; and wherein each of the plurality of base stations is arranged to bias an operation of the base station towards a reduced load level of the first MME in response to receiving the load reduction indication.

The invention may in many scenarios allow improved performance in a cellular communication system. In particular, an improved load distribution for MMEs can be achieved allowing a higher capacity and improved performance of the cellular communication system as a whole. A more flexible load management may be achieved and in particular a more gradual load redistribution can often be achieved to mitigate or prevent overload conditions. A reduced additional loading of the first MME caused by the overload mitigation process may be achieved in many scenarios. In particular, the overload signaling may in many situations be reduced.

Specifically, the invention may in many embodiments and scenarios provide improved dynamic adaptation of overload mitigation operations to the currently experienced conditions while maintaining a reduced resource usage and complexity.

The subset of base stations may specifically be selected to represent base stations that are most likely to be able to improve the load conditions of the first MME. The approach may allow a faster and/or improved remedial action by the system to mitigate overload conditions and may in particular allow the remedial action to be focused on particularly suitable base stations.

The load reduction indication may be sent only to the subset of base stations by the transmitting means. However, in some scenarios, the load reduction indication may further be distributed to other base stations e.g. using peer-to-peer communications between the base stations.

The MME load characteristic for a given base station may for example comprise a load contribution characteristic for the base station. The load contribution characteristic may specifically indicate a measure of the contribution to the load level of the first MME which is caused by the base station.

The MME load characteristic for a given base station may for example comprise a load change characteristic for the base station. The load contribution characteristic may specifically indicate a measure of the ability of the base station to change/or vary its contribution to the load level of the first MME.

According to another aspect of the invention there is provided a method of operation for a cellular communication system including a Mobile Management Entity, MME, and a plurality of base stations coupled to the MME and arranged to serve user equipments over an air interface, the method comprising: determining an MME load characteristic for the MME for each base station of the plurality of base stations in response to a measured operating characteristic of each base station; selecting a subset of base stations from the plurality of base stations in response to the MME load characteristics; determining a load level measure for the MME; and transmitting a load reduction indication for the first MME to the subset of base stations in response to the load level measure for the MME meeting a first criterion.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a Long Term Evolution (LTE) system. However, it will be appreciated that the invention is not limited to this application but may be applied to many other cellular communication systems.

Figure 1:
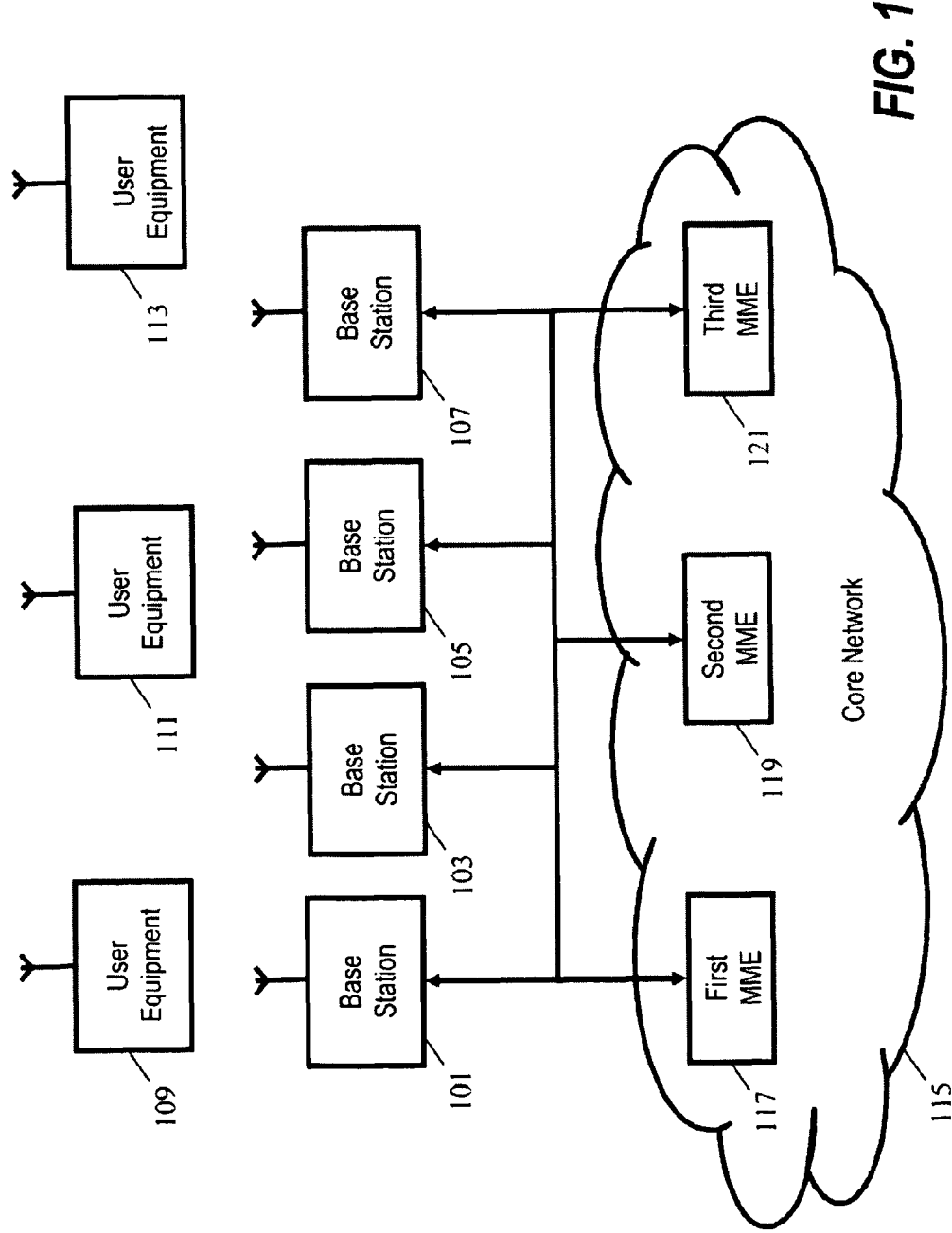
FIG. 1 illustrates an example of elements of a cellular communication system in accordance with some embodiments of the invention.

FIG. 1 illustrates an example of elements of a cellular communication system in accordance with some embodiments of the invention.

The LTE system of FIG. 1 comprises a number of LTE base stations 101-107 (also known as evolved Node B's eNB's) each of which supports user equipments 109-113 in a cell served by the base stations 101-107. In an LTE system, the base stations comprise significant functionality for controlling the air interface communications with the user equipments including functionality for resource allocation, attachment control, handover operation etc.

Specifically, for LTE the Radio Access Network (RAN) consists of a single node, (the base station or eNB) which interfaces with the user equipments over the air interface and hosts the PHYsical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, cell information broadcast, ciphering/deciphering of user and control plane data, and compression/decompression of user plane packet headers etc.

The system furthermore comprises a core network 115 which comprises a number of Serving GateWays (SGW) (not shown) and Mobility Management Entities (MMEs) 117-121.

An SGW routes and forwards user data packets and also acts as the mobility anchor for the user plane during inter-eNB handovers and as the anchor for mobility between LTE and other 3GPP technologies. Thus, the SGW is responsible for much of the user plane communication and management.

An MME is the key control-node for the LTE access-network. It is responsible for idle mode user equipment tracking and paging procedures including retransmissions. The MME is also involved in the bearer activation/deactivation process and is responsible for choosing the SGW for a user equipment at the initial attach and at time of intra-LTE handover involving core network node relocation.

The MME is furthermore responsible for authenticating the user and for generation and allocation of temporary identities to user equipments. The MME also provides the control plane function for mobility between LTE and 2G/3G access networks etc.

In LTE, the core network knows the location of an idle mode user equipment to the granularity of a few cells, called the Tracking Area (TA). When there is a user equipment-terminated call, the user equipment is paged in its last reported TA. A user equipment can be assigned multiple TAs and whenever it detects that it has moved outside the assigned TAs, it performs a registration update with the core network (and specifically with an MME) resulting in a new set of TAs being allocated.

LTE generally provides a pool of MMEs 117-121 that may be used by the base stations 101-107. Typically, a pool of MMEs is provided for a set of tracking areas such that all base stations assigned to one of these tracking areas can be supported by any of the MMEs in the pool. Furthermore, the base station may freely select the MME 117-121 which supports an individual user equipment from the pool of MMEs 117-121 and may specifically select different MMEs 117-121 for different user equipments. Thus, the air interface communications of one base station 101-107 will typically be supported by a plurality of MMEs 117-121 of the pool.

As long as a user equipment stays within the set of TAs associated with a pool of MMEs 117-121, the serving MME is not changed for the user equipment. However, if a user equipment moves out of this set of TAs, a new MME must be assigned such that it belongs to the pool supporting the new TA. Thus, in LTE, MME selection is typically performed by the individual base station for a user equipment whenever this makes an initial attachment to the system or whenever it moves out of the set of tracking areas which is supported by a given MME pool.

Figure 2:
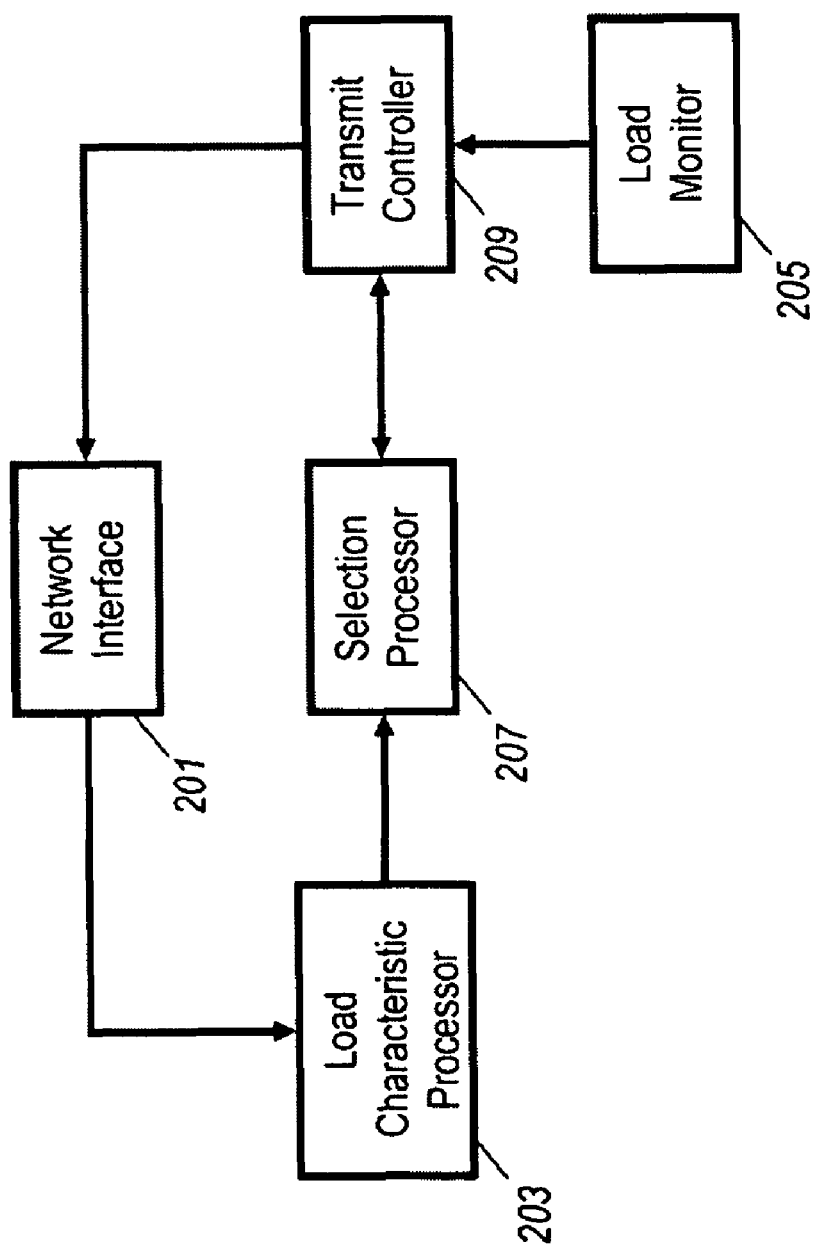
FIG. 2 illustrates an example of elements of a mobility management entity in accordance with some embodiments of the invention.

As the bandwidth and computational resources of the individual MMEs 117-121 are limited and the MME selection is performed by the individual base stations 101-107, an MME may become overloaded. In the example of FIG. 2, the system comprises functionality for monitoring the load of the individual MMEs 117-121 and for biasing the MME selections of the base stations 101-107 to provide improved MME load management and distribution. Furthermore, the biasing by the base stations 101-107 is selectively controlled in response to a load characteristic for each base station 101-107. For example, MME selection is particularly biased away from a highly loaded MME 117 for base stations 101-107 which tend to have a high load contribution to the MME 117 and/or which have many system attachments or MME reselection actions thereby providing many options for shifting load between MMEs 117-121.

It will be appreciated that whereas FIG. 1 for clarity and brevity illustrates four base stations 101-107 served by a pool of three MMEs 117-121 a practical system may typically be substantially more complex. For example, a pool of 5-10 MMEs may often support 500-700 base stations.

In the following, a description will be provided wherein each MME 117-121 comprises local functionality for influencing the operation of the base stations 101-107. However, it will be appreciated that in other embodiments, some or all of the functionality may be located elsewhere such as in other MMEs or network elements.

FIG. 2 illustrates an example of elements of an MME in accordance with some embodiments of the invention. The description will focus on a single MME 117 of the pool of MMEs 117-121 but it will be appreciated that some or all of the MMEs 117-121 may comprise the described functionality.

The MME 117 comprises a network interface 201 which interfaces the MME 117 to the external network. In particular, the network interface 201 is arranged to communicate with each of the base stations 101-107 over an LTE S1 interface. Specifically, the network interface 201 supports control plane signaling between the MME 117 and the base stations 101-107.

The network interface 201 is coupled to a load characteristic processor 203 which is arranged to determine an MME load characteristic for the MME 117 for each base station of the base stations 101-107 supported by the pool of MMEs 117-121. The load characteristic is determined in response to a measured operating characteristic of each base station 101-107.

Thus, for each of the base stations 101-107 supported by the pool of MMEs 117-121 the load characteristic processor 203 determines a load characteristic for that base station 101-107 depending on a monitoring of the behaviour of the base station 101-107. The load characteristic may specifically be an indication of the MME load that has historically been required to support the individual base station 101-107, i.e. it may be an indication of the MME load level contribution (for the pool of MMEs or for the individual MME) provided by the individual base station 101-107. Alternatively or additionally, the load characteristic may be an indication of a typical ability to change the load distribution for the individual base station 101-107. For example, it may be an indication of how many user equipment attachments and MME pool re-assignments are typically performed using this base station 101-107 since this may be an indication of how quickly MME load can be shifted from one MME 117 to another MME 119, 121 of the pool.

The MME 117 furthermore comprises a load monitor 205 which continuously monitors the loading of the MME 117 to generate a load level measure. The load level measure may for example comprise an indication of bandwidth loading, computational resource usage and/or memory usage. As a simple example, the load level measure may simply be a count of how many user equipment air interface communications are currently handled by the MME 117.

The load monitor 205 is coupled to a transmit controller 209 which is further coupled to the network interface 201. The transmit controller 209 is arranged to continuously compare the load level measure to a criterion which specifically may correspond to a predetermined criterion for a high loading of the MME 117. The criterion may for example comprise alternative requirements of the computational, bandwidth and memory resource usage such that the criterion is met if any of these exceeds a given threshold. In the system, the criterion is determined such that the load level measure meeting the criterion is indicative of the loading of the MME 117 being high but not yet being overloaded. Accordingly, the MME 117 may proceed to instigate remedial action which can result in e.g. a load redistribution between the MMEs 117-121 of the pool thereby mitigating or preventing overload from happening.

In the system of FIG. 1, the remedial action comprises sending a load reduction indication for the MME 117 to a subset of the base stations 101-107. Thus, when the criterion is met, the transmit controller 209 transmits (via the network interface 201) a load reduction indication to some of the base stations, such as e.g. to the first and second base station 101-103 of FIG. 1.

The transmit controller 209 is furthermore coupled to a selection processor 207 which is further coupled to the load characteristic processor 201. The selection processor 207 is arranged to perform the selection of the subset of base stations 101-103 to which to send the load reduction indication. Thus, the selection processor 207 receives the determined MME load characteristics from the base stations 101-107 and selects the subset based on the load characteristics.

Specifically, the selection processor 207 may select a predetermined number of base stations as the base stations that provide the highest load level contribution and/or which are most likely to be able to redistribute loading quickly (e.g. by initiating a large number of MME (re)selections).

The subset of base stations 101-103 that receive the load reduction indication proceeds to modify their operation such that the loading of the MME 117 for which the load reduction indication is received tends to be reduced. Thus, in response to receiving the load reduction indication, the base stations 101-107 bias their operation towards a reduced load level for the MME 117.

Specifically, the base stations 101-103 may bias their MME selection away from the MME 117 for which the load reduction indication is received. Thus, whenever a new user equipment attaches (or requires an MME re-assignment) the base stations 101-107 will reduce the likelihood that the first MME 117 is selected if a load reduction indication has been received therefor. As a simple example, the base stations 101-107 may be arranged to not select any MME for which an active load reduction indication has been received.

As a result, the loading of the highly loaded MME 117 will typically tend to be reduced as the number of user equipments leaving the MME 117 will exceed the number of new user equipments attaching to the MME 117 (e.g. from base stations 105-107 not in the subset). Furthermore, as the subset of base stations 101-103 is specifically selected to be base stations that have significant load contribution and/or have many load changing actions, the load reduction will tend to be significant and/or fast.

Thus, in the system of FIG. 1, the MME load mitigation operation is specifically targeted at base stations 101-103 which are likely to provide the most significant and/or fastest load reduction/load distribution. This may provide improved performance in many situations and may specifically in many scenarios allow a more gradual and stable overload mitigation/prevention. For example, it may allow a more gradual redistribution of load from a heavily loaded MME to less loaded MMEs of the pool with reduced risk that the redistribution will cause these MMEs to be overloaded. It may further allow a reduced resource usage and complexity of the overload mitigation operation. For example, it may reduce the signaling as load reduction indications need only to be communicated to a reduced number of base stations.

In the system of FIG. 1 each of the MMEs 117-121 accordingly has sufficient intelligence to pinpoint which base stations 101-107 are more likely to result in suitable overload reduction for the individual MME 117-119.

Typically, base stations at the border of an MME pool area may be significant contributors to MME assignment selection as they tend to support a higher number of MME reassignments than base stations which are well within the area supported by a given MME pool. Furthermore, in many deployments there may typically be some cells that statistically have many more attach procedures than other cells and accordingly these base stations may perform many more MME selections.

In the system of FIG. 1, the MME 117 can specifically collect information on a frequency of MME reassignments or initial attachments and use this as the MME load characteristic. The selection processor 207 then selects the subset of base stations 101-103 as the base stations having the highest number of MME reassignments or initial attachments. Thus, when the high load criterion is met, the MME 117 controls specifically selected base stations 101-103 to change their operation rather than all of the base stations 101-107.

In the example, the selection of the subset of base stations 101-103 is based on a statistical evaluation of the previous operation of the individual base stations 101-107. Specifically, the load characteristic processor 203 monitors the activity of each base station 101-107 and averages this to determine an averaged reselection activity level. The averaging may for example correspond to a low pass filtering of a given activity parameter. E.g. the number of MME selections of the first MME 117 made by a base station 101 may be monitored and suitably averaged to provide a statistically relevant measure of a typical number of MME selections of the first MME 117 made by the base station 101 in a given time interval.

As previously described, for the first MME 117, the MME load characteristic for a base station 101 may be indicative of a load level contribution to the first MME 117 by the base station 101. For example, the load characteristic processor 203 may monitor how many user equipments served by the base station 101 are supported by the first MME 117. In such an example, the selection processor 207 may proceed to select the subset to comprise the base stations for which a high number of user equipments are supported thereby allowing a typically more substantial load reduction.

In some embodiments, the load characteristic processor 203 may determine the MME load characteristics for a base station 101 in response to MME signaling activity for the first MME 117 for that base station 101.

Specifically, the signaling activity of different user equipments may vary substantially and thus the signaling that needs to be supported by the MME 117 may also vary for the individual user equipment. In some embodiments, the load characteristic processor 203 may monitor how much signaling support is required for the user equipments of the individual base stations 101-107 and may determine the loading of the MME 117 caused by the base station 101-107 on the basis of not only the number of user equipments supported but also on the amount of signaling that is performed for the user equipments.

Also, as previously mentioned, the MME load characteristic for a first base station 101 may alternatively or additionally be indicative of a user equipment MME selection activity level for the first base station. The MME selection activities may specifically be new user equipment attachment MME selections and MME reassignment selections made by the first base station 101.

For example, the load characteristic processor 203 may simply monitor how many user equipment MME registrations (preferably including both new attachments and MME reassignments) are made at the first MME 117 by the first base station 101. An averaged or typical number of registrations for a given time interval may then be determined and included in (or used as) the MME load characteristic.

This may allow the selection processor 207 to select the subset to comprise base stations for which many MME selections are frequently made thereby allowing it to specifically target the load mitigation operation at base stations which are likely to have many options for selecting other MMEs. This may result in a faster load redistribution between the pool of MMEs.

In the previous examples, the MME load characteristic was determined on the basis of information monitored by the MME itself and based on the information which is otherwise available at the MME itself. However, it will be appreciated that in other examples, the MME load characteristic may alternatively or additionally be based on information provided from external elements.

For example, in some embodiments, the MME load characteristic may be determined to include information related to other MMEs 119-121 or equivalently the selection of the subset by the selection processor 207 may take into account information related to other MMEs 119-121.

E.g., each of the MMEs 119-121 may generate an individual MME load characteristic for each base station 101-107. This information may then be exchanged between the MMEs 117-121 such that each MME 117-121 have information of the load characteristic of each base station 101-107 which relates not only to itself but also to other MMEs 117-121 of the pool.

This may allow the selection processor 207 to select base stations that are more likely to result in the desired load mitigation since in general, the information on the load characteristics of each base station obtained at all MMEs in the pool will allow for better statistical assessment of the load contribution of each base station. Furthermore, this will also provide information on unknown MME selection biases that may require correction. For example, if a first base station contributes a high but equal amount of loading to all MMEs whereas a second base station contributes a high load only to an overloaded MME, the selection processor 207 may specifically target the load mitigation at the second base station in preference of the first base station.

As a specific scenario a base station may have received an overload indication for a first MME. If a second MME then starts to get into overload, it could find that certain base stations are sending it more user equipments than is normally the case, and accordingly it may seek to counteract this by sending its own overload indication to these base stations.

When receiving the second overload indication, the individual base station then becomes aware that it should treat both MMEs equally.

It will be appreciated, that in some embodiments the base stations 101-107 may provide additional information to be MMEs 117-121 allowing the load characteristic processor 203 to determine the MME load characteristic. For example, the base stations 101-107 may report the total number of MME selections made thereby allowing the individual MME to assess the proportion of MME selections that result in a selection of the specific MME.

In the example of FIG. 1, the load monitor 205 continues to monitor the loading of the MME 117 following the transmission of the load reduction indication. Furthermore, depending on the behaviour of the loading, the transmit controller 209 may continue to provide a second (or further) load reduction indication.

For example, the transmit controller 209 may continue to monitor whether the load level measure generated by the load monitor 205 meets a second criterion indicative of a high load. If so, the transmit controller 209 may proceed to transmit a second load reduction indication which specifically may be a load reduction indication that result in a stronger bias away from the first MME 117. The criterion for sending the second load reduction indication may be the same as the criterion for sending the first load reduction indication.

For example, when the transmit controller 209 first detects that the loading of the MME has increased above a given threshold, it proceeds to transmit the first load reduction indication to the selected subset of base stations 101-107. It then continues to monitor the loading of the first MME 117 and if this does not fall sufficiently it proceeds to generate a second load reduction indication which results in even stronger bias away from the first MME 117.

The stronger bias may for example be achieved by the second load reduction indication comprising data requiring the base stations to introduce a stronger bias away from the first MME 117 when performing MME selection. Alternatively or additionally, the second load reduction indication may be distributed further than the first load reduction indication. For example, the second load reduction indication may be transmitted to a larger subset of base stations, or indeed be transmitted to all base stations.

Alternatively, if the transmit controller 209 detects that the load level measure meets a criterion which is indicative of the loading of the first MME 117 reaching an acceptable level, it may proceed to generate and transmit a load reduction termination indication to the subset of base stations 101-103. In response to receiving this load reduction termination indication, the base stations 101-103 proceed to remove the selection bias thereby ending the overload mitigation operation.

It will be appreciated that whereas the previous description focused on an embodiment wherein the overload mitigation control functionality is located in the MME, some or all of the functionality may in other embodiments be located elsewhere.

For example, in some embodiments all the MMEs of an MME pool may be coupled to an external overload mitigation server which is arranged to perform the functionality previously described with reference to FIG. 2.

For example, the load mitigation server may receive information from each of the MMEs 117-121 indicating how many new MME registrations are received from each base station 101-107. It may then proceed to generate an MME load characteristic for each base station 101-107 and each MME 117-121. The load mitigation server may furthermore receive loading information from each MME 117-121 and may thus detect if any of the MMEs enter a high load status. If so, the load mitigation server may proceed to select the subset of base stations 101-103 based on the load characteristics and then transmit a suitable load reduction indication directly to these base stations 101-103.

It will be appreciated that other variations and permutations of the distribution of functionality may be used in different embodiments and may depending on the characteristics and preferences of the individual embodiments provide various advantages and benefits. For example, in some embodiments the functionality of the load characteristic processor 203 and the load monitor 205 may be local in the individual MMEs 117-121 whereas the functionality of the selection processor 207 and the transmit controller 209 may be located in a central load mitigation server supporting a plurality of MMEs 117-121. In this case, the individual parameters may be determined locally whereas the overall over load mitigation control may be performed centrally taking into account the operating conditions for all MMEs 117-121 of the MME pool.

In some embodiments, the load reduction indication may be distributed directly amongst the base stations without any further involvement by the MME. Specifically, the load reduction indication may be transmitted to the subset of base stations which may distribute the load reduction indication directly to other base stations not part of the subset. However, in the example, the base station distribution of the load reduction indication is controlled by the MME by including a base station distribution preference in the load reduction indication.

Specifically, the transmit controller 209 may include a base station distribution preference in the load reduction indication and each of the base stations may be arranged to distribute the load reduction indication to other base stations in response to this distribution preference data. This distribution may be performed using peer-to-peer communications between evolved eNBs (through the interface known as the X2 interface).

In the example, the base stations may simply be arranged to distribute the load reduction indication to the base stations that they are directly coupled to and/or which are neighbours of the base station (if allowed by the distribution preference).

The individual base station may accordingly receive the load reduction indication either directly from an MME or from another base station. It may then not only proceed to modify the operation to bias MME selection away from the highly loaded MME but may also evaluate whether the received load reduction indication should be forwarded further to other base stations. If the distribution preference indicates that further distribution should be performed, the base station proceeds to forward the load reduction indication to its neighbour base stations (except for any base stations from which the load reduction indication was received). Thus, the system allows the load reduction indication to be distributed to an increasing number of base stations without necessitating any further signaling or processing by the MME (and thus without increasing the loading thereof).

The distribution of the load reduction indication may for example be controlled by the distribution preference comprising an indication of a preferred number of base station distribution steps that are allowed for the load reduction indication. For example, the distribution preference may comprise an indication that the maximum number of distribution steps is zero corresponding to no further distribution of the load reduction indication by the base stations. In others scenarios, the distribution preference may comprise an indication that the maximum number of distribution steps is one resulting in the load reduction indication being distributed to neighbours of the first base station and no further. If the maximum number of distribution steps is two, the first base station may forward the load reduction indication to each of its neighbour base stations and each of these may further forward the load reduction indication to their neighbours. Thus, the number of base stations/cells that controlled to perform MME overload mitigation may be effectively controlled while keeping the complexity and signaling requirements for the MME very low.

When an individual base station receives a load reduction indication either from the MME or from another base station, it proceeds to extract the distribution preference and specifically step value contained in the load reduction indication. If this value is higher than zero it proceeds to decrement the distribution step value and forward it to its neighbour base stations.

In some scenarios, the individual base station may receive the same load reduction indication from different neighbouring base stations. Accordingly, the base station may keep track of the load reduction indications that it has already forwarded. It may then for each newly received load reduction indication check whether it has already been received from another base station, and has already been forwarded. If so, the base station prevents the forwarding of the newly received load reduction indication.

Thus, in the example, the load reduction indication may be transmitted to the base stations of the subset over the S1 interface between the MMEs 117-121 and the base stations 101-107. The load reduction indication specifically contains an optional field requesting further distribution/propagation on the X2 interface between the base stations 101-107. The base stations 101-107 then proceed to propagate the load reduction indication in their peer-to-peer links (over X2) in accordance with the distribution preference.

The distribution preference is specifically a distribution step or chain length indicator which corresponds to how many neighbour relationships should be used for propagation. For example, a length of 1 means that the load reduction indication is sent by the receiving base station (over X2) to all its neighbours. These will then decrement the chain length to zero so that no further propagation occurs. A chain length of two means that "neighbours of neighbours" will receive the load reduction indication etc.

The combination of the initial selected distribution of the load reduction indication to a subset of base stations followed by a controlled distribution between the base stations themselves allows a very flexible, efficient and low complexity overload mitigation which specifically adds only very little additional MME resource usage.

Furthermore, simply by selecting a relevant subset and suitable distribution parameters, the degree of overload mitigation performed in the system can be effectively and flexibly controlled.

The base station distribution preference can be determined in response to the load level measure. For example, for a loading that is indicative of the MME slowly approaching overload, the load reduction indication may be transmitted to only the subset of base stations without any further distribution. However, if the load measure indicates that the MME is very close to overloading, a more aggressive overload mitigation may be implemented by selecting a larger initial subset and/or by further distribution of the load reduction indication between the base stations.

For example, when the load level measure first exceeds a given threshold, a load reduction indication may be transmitted with a distribution preference which indicates that no distribution should be performed. However, if this does not result in the MME load level decreasing, a second load reduction indication may be transmitted to the subset indicating that the indication should be forwarded with a chain length of one or two. If this still does not result in a sufficiently decreasing load level, a third load reduction indication may be transmitted that indicates that the load reduction indication should be distributed to all base stations (corresponding to an infinite chain length).

Conversely, if the transmit controller 209 detects that the load level measure meets a criterion which is indicative of the loading of the first MME 117 reaching an acceptable level, it may proceed to generate and transmit a load reduction termination indication including a distribution preference. Typically, this termination indication may be distributed to the same base stations as the most recent load reduction indication, including the same distribution preference. However other variations are also possible, including the use of a smaller subset of base stations or smaller chain lengths, in order to reduce the previously introduced bias in a slow and controlled manner.

Figure 3:
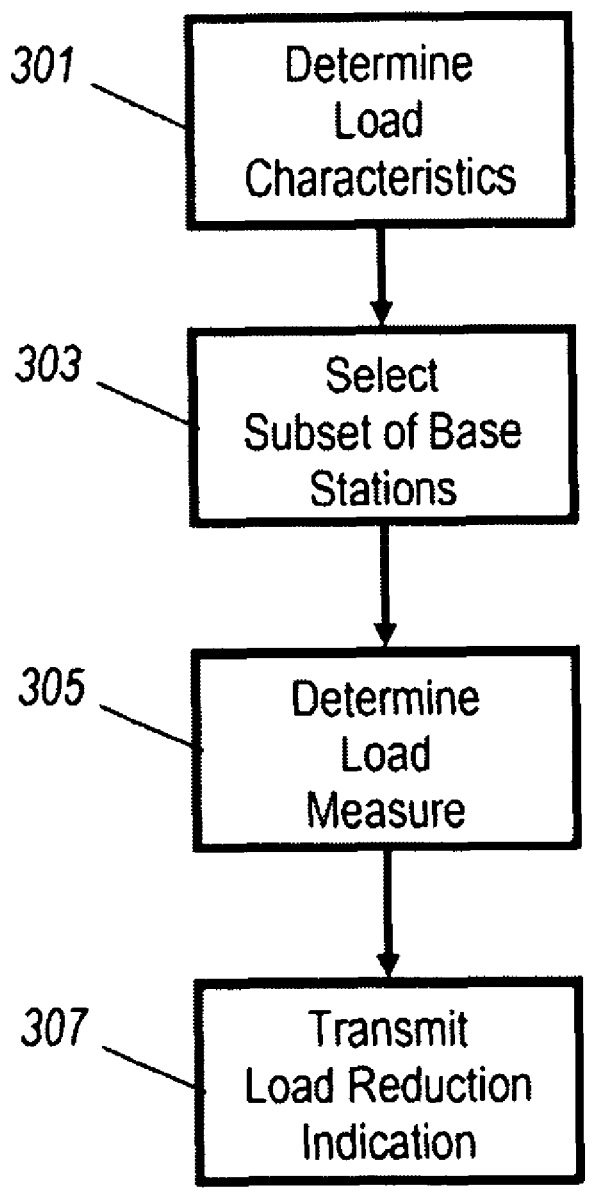
FIG. 3 illustrates an example of a method of operation for a cellular communication system in accordance with some embodiments of the invention.

FIG. 3 illustrates an example of a method of operation for a cellular communication system including a Mobile Management Entity, MME, and a plurality of base stations coupled to the MME and arranged to serve user equipments over an air interface.

The method initiates in step 301 wherein an MME load characteristic is determined for the MME for each base station of the plurality of base stations in response to a measured operating characteristic of each base station.

Step 301 is followed by step 303 wherein a subset of base stations is selected from the plurality of base stations in response to the MME load characteristics.

Step 303 is followed by step 305 wherein a load level measure is determined for the MME.

Step 305 is followed by step 307 wherein a load reduction indication is transmitted for the first MME to the subset of base stations in response to the load level measure for the MME meeting a first criterion.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system comprising:
   a first Mobile Management Entity, MME;
   a plurality of base stations coupled to the first MME and arranged to support user equipments over an air interface;
   load means for determining an MME load characteristic for the first MME for each base station of the plurality of base stations in response to a measured operating characteristic of each base station;
   selection means for selecting a subset of base stations from the plurality of base stations in response to the MME load characteristics;
   load level means for determining a load level measure for the first MME; and
   transmitting means for transmitting a load reduction indication for the first MME to the subset of base stations in response to the load level measure for the first MME meeting a first criterion;
   wherein each of the plurality of base stations is arranged to bias an operation of the base station towards a reduced load level of the first MME in response to receiving the load reduction indication;
   wherein the transmitting means is arranged to include a base station distribution preference in the load reduction indication; and wherein each of the plurality of base stations is arranged to distribute the load reduction indication to other base stations in response to the base station distribution preference; and
   wherein at least a first of the plurality of base stations is arranged to prevent forwarding of a load reduction indication received from a second base station in response to a detection that a corresponding load reduction indication received from a third base station has been forwarded.

2. The cellular communication system of claim 1 wherein an MME load characteristic for a first base station of the plurality of base stations is indicative of a load level contribution to the first MME by the first base station.

3. The cellular communication system of claim 1 wherein an MME load characteristic for a first base station of the plurality of base stations is indicative of a user equipment MME selection activity level for the first base station.

4. The cellular communication system of claim 1 wherein the load means is arranged to determine the MME load characteristics in response to user equipment MME registrations for the first MME for the plurality of base stations.

5. The cellular communication system of claim 1 wherein the load means is arranged to determine the MME load characteristics in response to MME signalling activity for the first MME for the plurality of base stations.

6. The cellular communication system of claim 1 wherein the load means is further arranged to determine an MME load characteristic for a second MME for each base station of the plurality of base stations in response to a measured operating characteristic of each base station; and the selection means is arranged to select the subset of base stations in response to the MME load characteristics of both the first MME and the second MME.

7. The cellular communication system of claim 1 wherein the first MME comprises at least one of: the load means, the selection means, the load level means; and the transmitting means.

8. The cellular communication system of claim 1 wherein the first MME does not comprise at least one of: the load means, the selection means, the load level means, and the transmitting means.

9. The cellular communication system of claim 1 wherein the plurality of base stations is arranged to bias an MME selection away from the first MME in response to receiving the load reduction indication.

10. The cellular communication system of claim 1 wherein the load means is arranged to determine the MME load characteristic for each base station in response to an averaged previous MME activity measure for each base station.

11. The cellular communication system of claim 1 further comprising means for determining the base station distribution preference in response to the load level measure.

12. The cellular communication system of claim 1 wherein the distribution preference comprises an indication of a preferred number of base station distribution steps for the load reduction indication.

13. The cellular communication system of claim 1 wherein a first base station is arranged to forward the load reduction indication received from a second base station in response to the base station distribution preference of the load reduction indication.

14. The cellular communication system of claim 1 further comprising means for monitoring a load level indication for the first MME following a transmission of the load reduction indication; and wherein the transmitting means is arranged to transmit a second load reduction indication in response to the load level indication meeting a second criterion.

15. The cellular communication system of claim 1 wherein the transmitting means is arranged to transmit a load reduction termination indication following a transmission of the load reduction indication in response to the load level measure meeting a second criterion; and the plurality of base stations is arranged to remove the bias in response to receiving the load reduction termination indication.

16. The cellular communication system of claim 15 wherein the load reduction termination indication comprises a base station distribution preference for the load reduction termination indication.

17. A Mobile Management Entity, MME, for a cellular communication system including a plurality of base stations coupled to the MME and arranged to serve user equipments over an air interface, the MME comprising:
   load means for determining an MME load characteristic for the MME for each base station of the plurality of base stations in response to a measured operating characteristic of each base station;

selection means for selecting a subset of base stations from the plurality of base stations in response to the MME load characteristics;

load level means for determining a load level measure for the MME; and transmitting means for transmitting a load reduction indication for the first MME to the subset of base stations in response to the load level measure for the MME meeting a first criterion;

wherein the transmitting means is arranged to include a base station distribution preference in the load reduction indication; and wherein each of the plurality of base stations is arranged to distribute the load reduction indication to other base stations in response to the base station distribution preference; and wherein at least a first of the plurality of base stations is arranged to prevent forwarding of a load reduction indication received from a second base station in response to a detection that a corresponding load reduction indication received from a third base station has been forwarded.

18. A method of operation for a cellular communication system including a Mobile Management Entity, MME, and a plurality of base stations coupled to the MME and arranged to serve user equipments over an air interface, the method comprising:

determining an MME load characteristic for the MME for each base station of the plurality of base stations in response to a measured operating characteristic of each base station;

selecting a subset of base stations from the plurality of base stations in response to the MME load characteristics;

determining a load level measure for the MME; and transmitting a load reduction indication for the first MME to the subset of base stations in response to the load level measure for the MME meeting a first criterion;

wherein each of the plurality of base stations is arranged to distribute the load reduction indication to other base stations in response to a base station distribution preference in the load reduction indication; and wherein at least a first of the plurality of base stations is arranged to prevent forwarding of a load reduction indication received from a second base station in response to a detection that a corresponding load reduction indication received from a third base station has been forwarded.

\* \* \* \* \*